(12) United States Patent
Wang et al.

(10) Patent No.: US 12,319,345 B2
(45) Date of Patent: Jun. 3, 2025

(54) COMPOSITE MATERIAL CARRYING STRUCTURE APPLIED TO MOTOR VEHICLES

(71) Applicant: NextGen Exchange Group Inc., Grand Cayman (KY)

(72) Inventors: Jianjiang Wang, Zhangzhou (CN); Fuwen Xiao, Zhangzhou (CN)

(73) Assignee: NextGen Exchange Group Inc., Grand Cayman (KY)

( * ) Notice: Subject to any disclaimer, the term of this patent is extended or adjusted under 35 U.S.C. 154(b) by 386 days.

(21) Appl. No.: 17/883,836

(22) Filed: Aug. 9, 2022

(65) Prior Publication Data
US 2023/0311996 A1    Oct. 5, 2023

(30) Foreign Application Priority Data
Mar. 31, 2022 (CN) .......................... 202220780425.9

(51) Int. Cl.
*B62D 25/04* (2006.01)
*B62D 21/15* (2006.01)
*B62D 29/04* (2006.01)

(52) U.S. Cl.
CPC ........... *B62D 21/155* (2013.01); *B62D 25/04* (2013.01); *B62D 29/048* (2013.01)

(58) Field of Classification Search
CPC ........ B62D 25/02; B62D 25/04; B62D 25/06; B62D 25/07; B62D 25/24; B62D 27/023; B62D 29/04; B62D 29/043; B62D 29/046; B62D 29/048; B62D 25/004

USPC ........................................ 296/216.06–216.09
See application file for complete search history.

(56) References Cited

U.S. PATENT DOCUMENTS

| | | | |
|---|---|---|---|
| 6,877,796 B2* | 4/2005 | Kimura .................... | B60J 7/022 296/210 |
| 7,407,222 B2* | 8/2008 | Anderson .............. | B62D 25/04 296/193.06 |
| 2010/0090501 A1* | 4/2010 | Kinoshita .............. | B62D 33/06 296/193.06 |
| 2011/0254322 A1* | 10/2011 | Adamski .................. | B60J 7/022 296/216.08 |
| 2013/0257101 A1* | 10/2013 | Shono .................... | B62D 25/06 296/193.06 |
| 2014/0159425 A1* | 6/2014 | Kim .................. | B29C 45/14344 29/897.2 |

(Continued)

*Primary Examiner* — Gregory A Blankenship
(74) *Attorney, Agent, or Firm* — Dorsey & Whitney LLP

(57) ABSTRACT

A composite material carrying structure applied to motor vehicles includes a frame, an exterior composite material panel, an interior composite material panel overlapped with the exterior composite material panel and wrapping the frame together with the exterior composite material panel, and an R-corner outer frame, overlapped on the exterior composite material panel, and on which the interior composite material panel is overlapped. The end of the R-corner outer frame and the end of the exterior composite material panel are bent oppositely and fitted, so that a flow direction of water is effectively guided during drenching, and the waterproof effect is improved. With the frame wrapped by the interior and exterior composite material panels, the overall effect of strengthening a car body is achieved, stress of the car body is effectively shared, the light weight of the car body is improved, and energy consumption is reduced.

9 Claims, 2 Drawing Sheets

(56) References Cited

U.S. PATENT DOCUMENTS

| | | | |
|---|---|---|---|
| 2016/0101672 A1* | 4/2016 | Oshima | B62D 25/06 296/210 |
| 2018/0037273 A1* | 2/2018 | Aarts | B32B 27/36 |
| 2019/0225278 A1* | 7/2019 | Chiba | B60J 7/043 |
| 2021/0094243 A1* | 4/2021 | Mukainakano | B62D 25/04 |
| 2023/0311996 A1* | 10/2023 | Wang | B62D 29/048 296/191 |

* cited by examiner

COMPOSITE MATERIAL CARRYING STRUCTURE APPLIED TO MOTOR VEHICLES

CROSS-REFERENCE TO RELATED APPLICATIONS

This application claim priority to Chinese Patent Application CN 2022 2078 0425.9, filed Mar. 31, 2022, which is incorporated by reference herein, in the entirety and for all purposes.

FIELD

The present disclosure relates to the field of vehicle manufacturing technologies, and in particular to a composite material carrying structure applied to motor vehicles.

BACKGROUND

Sweepers are common machinery equipment in people's daily life, which provide a lot of convenience for people's daily life. For sweepers, the exteriors and interiors of the vehicles are important parts of the vehicles, which can give consumers the most intuitive feeling, so as to stimulate purchase intention of consumers. Therefore, the requirements for the overall technological level of sweepers are extremely high.

In the related art, the interiors and exteriors of sweepers are mainly butt-jointed and spliced, but such methods lead to segment gaps easily, thus desired appearance effect cannot be achieved, and rework, repair and painting make-up are frequently required, which not only requires much time and effort, but also wastes money and reduces purchase intention of consumers. In addition, effective waterproof effect cannot be achieved by butt-jointing and splicing the interiors and exteriors, and thus additional rubber seal strips are usually required to achieve a waterproof purpose. However, rubber seal strips are prone to aging and have a potential risk of water penetration, which greatly reduces the use experience of consumers.

SUMMARY

To overcome problems in the related art, the present disclosure provides a composite material carrying structure applied to motor vehicles.

According to an embodiment of the present disclosure, a composite material carrying structure applied to motor vehicles is provided, including a frame; an exterior composite material panel, disposed at an outer side of the frame; an interior composite material panel, which is overlapped with the exterior composite material panel, and wraps the frame together with the exterior composite material panel; and an R-corner outer frame, which is overlapped on the exterior composite material panel, and on which the interior composite material panel is overlapped, where an end of the R-corner outer frame and an end of the exterior composite material panel are bent oppositely and fitted at a lap joint between the R-corner outer frame and the exterior composite material panel.

In one implementation, a first end of the R-corner outer frame is overlapped with a first end of the exterior composite material panel; where the first end of the R-corner outer frame is bent toward an inner side of the R-corner outer frame; and the first end of the exterior composite material panel is bent toward a direction close to the R-corner outer frame.

In one implementation, the interior composite material panel is overlapped with a second end of the R-corner outer frame, the second end of the R-corner outer frame is bent toward an outer side of the R-corner outer frame, and an overlapping end of the interior composite material panel is bent toward a direction close to the second end of the R-corner outer frame.

In one implementation, the R-corner outer frame has a cambered surface.

In one implementation, the exterior composite material panel is provided with an opening, and an edge of the opening is provided with a glass mounting position.

In one implementation, the glass mounting position is formed by bending the edge of the opening toward an inner side of the exterior composite material panel and extending into the opening.

In one implementation, the exterior composite material panel includes a plurality of composite material panels which are overlapped in pairs; where an overlapping end of each of the composite material panels is bent toward an inner side of the composite material panel and extends outward for overlapping with the other overlapping end of an adjacent composite material panel.

In one implementation, the R-corner outer frame is integrally formed.

In one implementation, a buckle structure used for connecting the exterior composite material panel and the interior composite material panel is disposed on the interior composite material panel.

In one implementation, the composite material carrying structure applied to motor vehicles further includes sealing members, where the sealing members are disposed at lap joints between the exterior composite material panel and the R-corner outer frame, and between the interior composite material panel and the R-corner outer frame.

The technical solutions provided by the embodiments of the present disclosure may provide the following beneficial effects:

1. The interior composite material panel is overlapped with the exterior composite material panel to achieve convenient assembly and reduce segment gaps;
2. The end of the R-corner outer frame and the end of the exterior composite material panel are bent oppositely and fitted to effectively guide water flow, avoid water accumulation and penetration, and improve the waterproof effect;
3. The interior composite material panel and the exterior composite material panel are combined to wrap the frame to improve the overall strength of the car body and effectively share the stress of the car body; and
4. The overall light weight of the car body is improved and energy consumption is reduced.

BRIEF DESCRIPTION OF THE DRAWINGS

The drawings here are incorporated in the description, forming an integral part of it. They present embodiments in line with the present disclosure and, together with the description, are used to explain the principles of the present disclosure.

Figure 1:
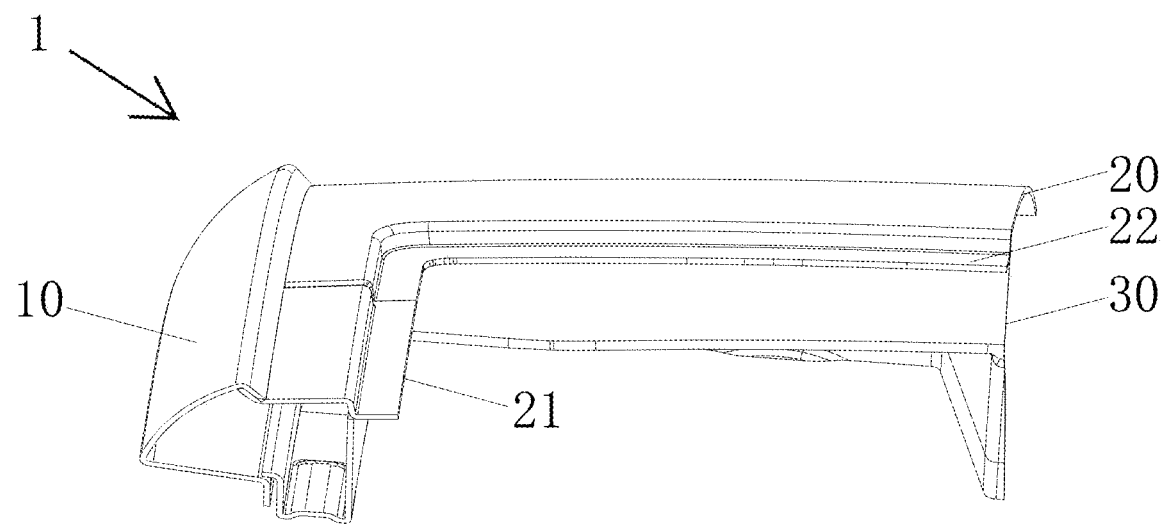
FIG. 1 is a schematic diagram of a composite material carrying structure applied to motor vehicles according to an exemplary embodiment.

Description of reference numerals in the drawings:

Frame 1, R-corner outer frame 10, first end 11 of the R-corner outer frame, second end 12 of the R-corner outer frame; exterior composite material panel 20, composite material panel 21, glass mounting position 22; interior composite material panel 30 and buckle structure 31.

DETAILED DESCRIPTION

Exemplary embodiments will be described in detail herein, examples of which are shown in the accompanying drawings. Where the following description relates to the accompanying drawings, unless otherwise indicated, the same number in different accompanying drawings indicates the same or similar element. Implementations described in the following exemplary embodiments do not represent all implementations consistent with the present disclosure, but merely examples of an apparatus and a method that are consistent with some aspects of the present disclosure, as described in detail in the appended claims.

The composite material carrying structure applied to motor vehicles provided by the embodiments of the present disclosure can be applied to sweepers and other motor vehicles. For illustrative purposes, a sweeper is now taken as an example.

EXAMPLES AND EMBODIMENTS

Figure 2:
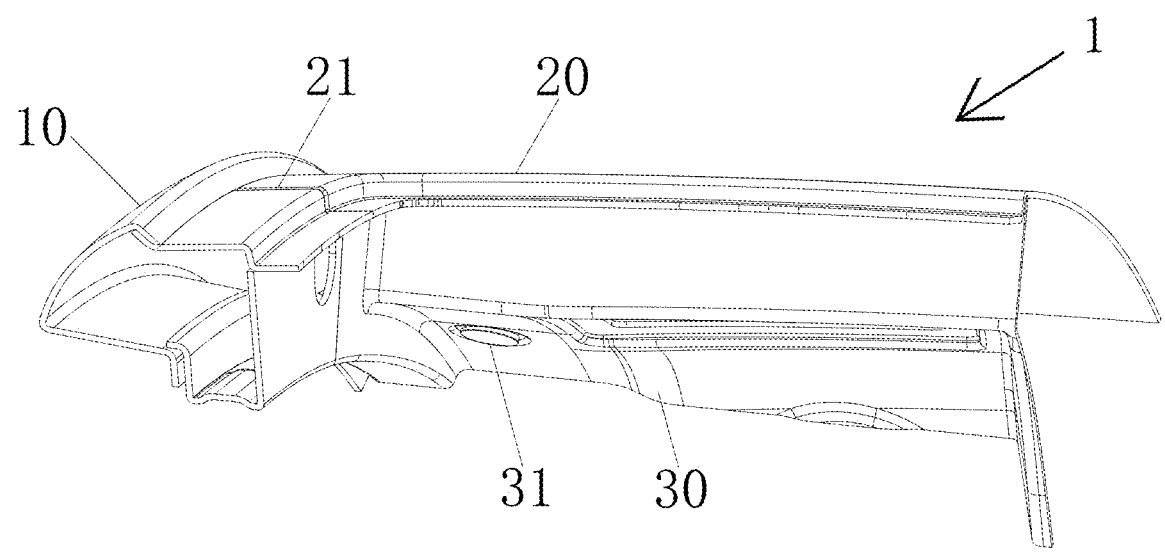
FIG. 2 is a schematic diagram of a composite material carrying structure applied to motor vehicles according to another exemplary embodiment.
Figure 3:
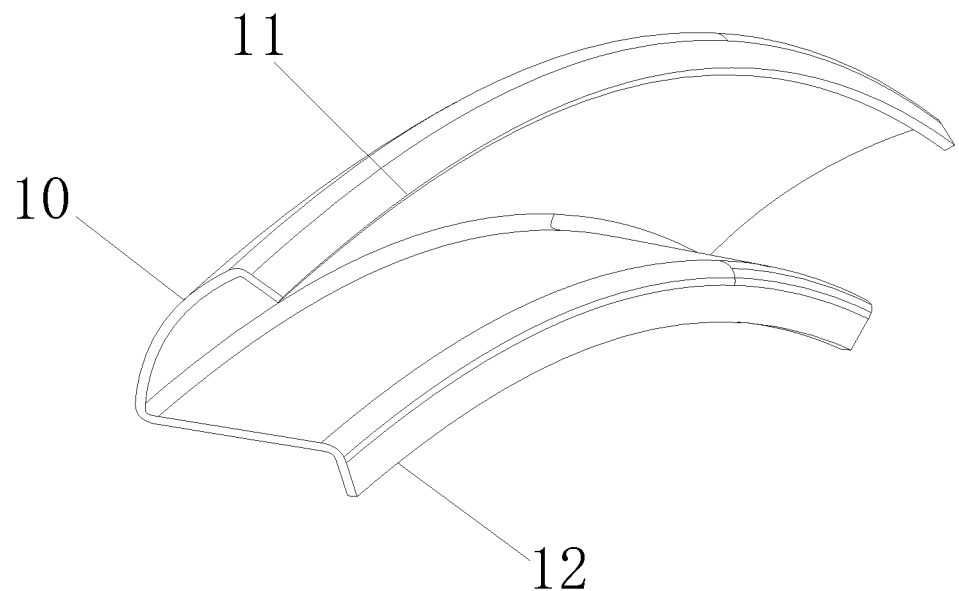
FIG. 3 is a schematic diagram of an R-corner outer frame of a composite material carrying structure applied to motor vehicles according to an exemplary embodiment.
Figure 4:
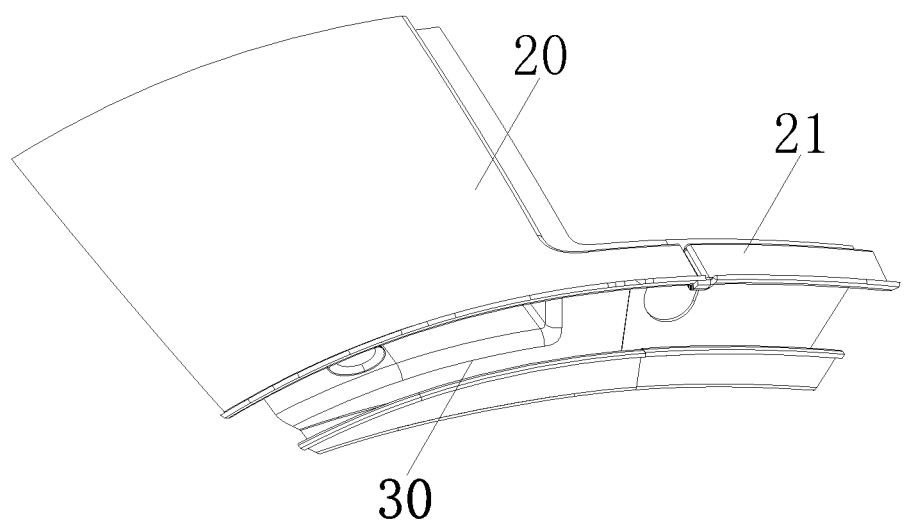
FIG. 4 is a schematic diagram showing overlapping between an interior composite material panel and an exterior composite material panel of a composite material carrying structure applied to motor vehicles according to an exemplary embodiment.

FIG. 1 is a schematic diagram of a composite material carrying structure applied to motor vehicles according to an exemplary embodiment. FIG. 2 is a schematic diagram of a composite material carrying structure applied to motor vehicles according to another exemplary embodiment. FIG. 3 is a schematic diagram of an R-corner outer frame of a composite material carrying structure applied to motor vehicles according to an exemplary embodiment. FIG. 4 is a schematic diagram showing overlapping between an interior composite material panel and an exterior composite material panel of a composite material carrying structure applied to motor vehicles according to an exemplary embodiment.

As shown in FIG. 1 to FIG. 4, the embodiments of the present disclosure provide a composite material carrying structure applied to motor vehicles, including a frame 1, an exterior composite material panel 20, an interior composite material panel 30 and an R-corner outer frame 10. As a skeleton of the whole sweeper, the frame 1 is used for supporting a sweeper body and installing the interior composite material panel 30 and the exterior composite material panel 20; the exterior composite material panel 20 is disposed on an outer side of the frame 1 to protect the sweeper body and improve aesthetics of the sweeper body; the interior composite material panel 30 is overlapped with the exterior composite material panel 20, and the interior composite material panel 30 and the exterior composite material panel 20 wrap the frame 1, so as to achieve the purposes of strengthening the strength and stability of the sweeper body and sharing stress of the sweeper body; the R-corner outer frame 10 is overlapped on the exterior composite material panel 20, and the interior composite material panel 30 is overlapped on the R-corner outer frame 10, where an end of the R-corner outer frame 10 and an end of the exterior composite material panel 20 are bent oppositely and fitted at a lap joint between the R-corner outer frame 10 and the exterior composite material panel 20 to effectively guide water flow, and avoid water accumulation and penetration.

According to the composite material carrying structure applied to motor vehicles provided by the embodiments of the present disclosure, the exterior composite material panel 20 is disposed on the outer side of the frame 1, so as to protect the sweeper body, improve the aesthetics of the sweeper body, and give consumers an intuitive feeling, thereby stimulating purchase intention of consumers. With the interior composite material panel 30 overlapped with the exterior composite material panel 20, the interior composite material panel 30 and the exterior composite material panel 20 can be overlapped with the frame 1 for convenient assembly, so as to effectively reduce segment gaps, and the frame 1 is wrapped between the interior composite material panel 30 and the exterior composite material panel 20, so as to improve the strength of the whole sweeper body, effectively share stress of the sweeper body, allow the sweeper body to be more stable and firm, and relatively achieve lightness and thinness of the frame 1, thereby achieving the light weight of the sweeper body and reduce energy consumption. The end of the R-corner outer frame 10 and the end of the exterior composite material panel 20 are bent oppositely and fitted to effectively guide water flow, avoid water accumulation and penetration, and improve the waterproof effect.

According to the composite material carrying structure applied to motor vehicles provided by the embodiments of the present disclosure, an outer side of the R-corner outer frame 10 is a cambered surface, and when water stains fall on the R-corner outer frame 10, the water stains will flow to the ground along the cambered surface, so as to achieve the function of guiding water flow. The R-corner outer frame 10 is integrally formed, so that the R-corner outer frame 10 is integrated as a whole and is not easy to break under local stress, and thus the firmness is stronger. In addition, the R-corner outer frames 10 on both sides of the frame 1 can function as door frames of the sweeper, effectively improve segment gaps at doors of the sweeper and surrounding gaps, and improve the overall aesthetics of the sweeper body while increasing the overall structural strength and stability. A first end 11 of the R-corner outer frame 10 is overlapped with a first end of the exterior composite material panel 20 in such an overlapping direction that the first end 11 of the R-corner outer frame 10 is bent toward an inner side of the R-corner outer frame 10 at an acute or right bending angle, but a bending part cannot be parallel to the exterior composite material panel, and the bending angle can be bent based on actual requirements. The first end of the exterior composite material panel 20 is bent toward a direction close to the R-corner outer frame 10 at an obtuse or right bending angle to allow a bent first end of the exterior composite material panel 20 to fit the first end 11 of the R-corner outer frame 10. The two ends overlap to form a lap joint, the lap joint forms an obtuse angle or a right angle with the exterior composite material panel 20. Water flows onto the exterior composite material panel 20 along the lap joint, and the bent exterior composite material panel 20 effectively prevents the water from penetrating into the interior of the sweeper, so that the water flows to the ground along the exterior composite material panel 20, thereby effectively guiding the water flow and avoiding water accumulation.

According to the composite material carrying structure applied to motor vehicles provided by the embodiments of the present disclosure, a second end 12 of the R-corner outer frame is overlapped with the interior composite material panel 30 and bent toward an outer side of the R-corner outer frame 10 in a bending direction, for example, vertically downward. An overlapping end of the interior composite material panel 30 is bent toward the second end 12 of the R-corner outer frame in a bending direction, for example, perpendicular to the second end 12 of the R-corner outer frame. The R-corner outer frame 10 is overlapped with the interior composite material panel 30, so that a lap structure of the sweeper body is complete, and the stability and firmness of an interior structure of the sweeper are increased.

Furthermore, to enable the first end 11 of the R-corner outer frame to be overlapped with the first end of the exterior composite material panel 20 more closely to improve the waterproof effect and impermeable function, the lap structure of the sweeper body further includes sealing members, the sealing members are disposed at lap joints between the exterior composite material panel 20 and the R-corner outer frame 10, and between the interior composite material panel 30 and the R-corner outer frame 10, and the sealing members can be, for example, sealing strips or a sealant, so as to increase the whole air tightness of the sweeper body and prevent water from penetrating into the interior of the sweeper body along lap gaps, which is not limited herein.

According to the composite material carrying structure applied to motor vehicles provided by the embodiments of the present disclosure, the exterior composite material panel 20 is provided with an opening, and an edge of the opening is provided with a glass mounting position 22, so as to achieve the purpose of mounting sweeper glass. In the embodiments of the present disclosure, the glass mounting position 22 is formed after the exterior composite material panel 20 is bent. The glass mounting position 22 is formed by bending the edge of the opening toward an inner side of the exterior composite material panel 20 and extending into the opening. The size of the glass mounting position 22 is based on an extended distance after bending, and the extended distance can be set based on the specification of used sweeper glass. The glass mounting position 22 is recessed to the inner side of the exterior composite material panel 20 as a whole. When mounting sweeper glass, an edge position of the sweeper glass is placed in the glass mounting position 22 along the bend, and the sweeper glass is supported to further fix the glass. Therefore, the segment gaps between the sweeper glass and the exterior composite material panel 20 can be effectively reduced by mounting the sweeper glass through the glass mounting position 22, so as to improve the overall aesthetics of the sweeper body, and the glass is firmly mounted and not easy to fall off. Accordingly, to further improve the windproof performance and water impermeability of the sweeper body, sealing members can also be disposed at junctions between the sweeper glass and the exterior composite material panel 20, and the sealing members can be a sealant or sealing strips, which is not limited herein.

The exterior composite material panel 20 can be an integral composite material panel 21 or a plurality of composite material panels to improve the convenience of mounting the exterior composite material panel 20. According to the composite material carrying structure applied to motor vehicles provided by the embodiments of the present disclosure, the exterior composite material panel 20 includes a plurality of composite material panels 21, and the plurality of composite material panels 21 are overlapped to form the glass mounting position 22 of the sweeper, where an overlapping end of each of the composite material panels 21 is bent toward an inner side of the composite material panel 21 and extends outward for overlapping with an overlapping end of an adjacent composite material panel 21. The composite material panels 21 each include a bent overlapping end and an unbent overlapping end, and the plurality of composite material panels 21 are overlapped in pairs, and a bent overlapping end is overlapped with an unbent overlapping end of an adjacent composite material panel 21. The composite material panels 21 are overlapped from bottom up, which can effectively prevent water accumulation and penetration and improve the waterproof effect. The number of overlapped composite material panels 21 is not limited herein, but depends on actual situations.

According to the composite material carrying structure applied to motor vehicles provided by the embodiments of the present disclosure, a buckle structure 31 used for connecting the interior composite material panel 30 and the exterior composite material panel 20 is disposed on the interior composite material panel 30 to improve the connection stability of the interior composite material panel 30 and the exterior composite material panel 20 of the sweeper body. The buckle structure 31 can be a combination of a clamping tongue and a clamping groove matched with each other, where the clamping tongue is disposed on the interior composite material panel 30, and the clamping groove is disposed on the exterior composite material panel 20, or the clamping tongue is disposed on the exterior composite material panel 20, and the clamping groove is disposed on the interior composite material panel 30. After the interior composite material panel 30 and the exterior composite material panel 20 are overlapped, the interior composite material panel 30 is fixedly connected to the exterior composite material panel 20 through the connection between the clamping buckle and the clamping groove. When the vehicle is overhauled, the buckle structure 31 can facilitate the disassembly of the interior composite material panel 30 and the exterior composite material panel 20, and thus improve the maintenance convenience of the sweeper.

To sum up, in addition to simple structure and convenient assembly, the composite material carrying structure applied to motor vehicles provided by the embodiments of the present disclosure improves the waterproof effect, effectively reduces segment gaps, and improves the aesthetics of the sweeper body. With the frame 1 wrapped by the interior composite material panel 30 and the exterior composite material panel 20, the firmness and stability are increased, so that the lightness and thinness of the frame 1 can be relatively reduced, the overall light weight of the sweeper body is improved, energy consumption is reduced, and the safety can be improved. With the buckle structure 31, the interior composite material panel 30 and the exterior composite material panel 20 are fixedly connected to increase the connection strength, and the panels can be disassembled to facilitate the overhaul of the sweeper. The water impermeability of the sweeper body can be further enhanced by disposing sealing devices at lap joints between the R-corner outer frame 10 and the exterior composite material panel 20 and the interior composite material panel 30.

It can be understood that "a plurality of" in the present disclosure means two or more, and other quantifiers are similar. "And/or", which describes an association relationship between associated objects, indicates that there can be three types of relationships. For example, "A and/or B" can represent three cases: only A, A and B, and only B. The character "/" usually represents that involved associated objects are in an "or" relationship. The singular forms of "a/an", "said" and "the" are also intended to include plural forms, unless otherwise specified in the context clearly.

It can be further understood that the terms "first", "second" and the like are used to describe various kinds of information, but these information should not be limited to these terms. These terms are only used to distinguish the same type of information from each other, and do not indicate a specific order or importance. In fact, expressions such as "first" and "second" can be used interchangeably. For example, without departing from the scope of the present disclosure, the first information may also be referred to as the second information, and similarly, the second information may also be referred to as the first information.

It can be further understood that an orientation or positional relationship indicated by the terms "center", "longitudinal", "transverse", "front", "back", "up", "down", "left", "right", "vertical", "horizontal", "top", "bottom", "inner", "outer" and the like is an orientation or positional relationship shown based on the accompanying drawings, is intended only to facilitate the description of the embodiment and simplification of the description rather than indicating or implying that a device or element referred to must have a specific orientation, or be constructed and operated in a specific orientation.

It can be further understood that, unless otherwise specified, "connection" includes both direct connection without other components between the two and indirect connection with other elements between the two.

It can be further understood that although operations are described in a specific order in the accompanying drawings in the embodiments of the present disclosure, it should not be understood that these operations are required to be performed in the specific order shown or in a serial order, or that all the operations shown are required to be performed to achieve desired results. In certain circumstances, multitasking and parallel processing may be advantageous.

Other embodiments of the present disclosure will be readily available to those skilled in the art after considering the specification and implementing the invention disclosed here. This application is intended to cover any variations, uses, or adaptive changes of the present disclosure, which follow the general principles of the present disclosure and include common general knowledge or conventional technical means in the art that are not disclosed in the present disclosure. The specification and embodiments are to be considered as illustrative only. The true scope and spirit of the present disclosure are indicated by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A composite material carrying structure applied to motor vehicles, comprising:
   a frame;
   an exterior composite material panel, disposed at an outer side of the frame;
   an interior composite material panel, which is overlapped with the exterior composite material panel, and wraps a portion of the frame together with the exterior composite material panel; and
   an R-corner outer frame, which is overlapped on the exterior composite material panel, and on which the interior composite material panel is overlapped, wherein an end of the R-corner outer frame and an end of the exterior composite material panel are bent oppositely and fitted at a lap joint between the R-corner outer frame and the exterior composite material panel; wherein a first end of the R-corner outer frame is overlapped with a first end of the exterior composite material panel; and wherein
      the first end of the R-corner outer frame is bent toward an inner side of the R-corner outer frame; and
      the first end of the exterior composite material panel is bent toward a direction close to the R-corner outer frame.

2. The composite material carrying structure applied to motor vehicles according to claim 1, wherein:
   the interior composite material panel is overlapped with a second end of the R-corner outer frame,
   the second end of the R-corner outer frame is bent toward an outer side of the R-corner outer frame, and
   an overlapping end of the interior composite material panel is bent toward a direction close to the second end of the R-corner outer frame.

3. The composite material carrying structure applied to motor vehicles according to claim 1, wherein the R-corner outer frame has a cambered surface.

4. The composite material carrying structure applied to motor vehicles according to claim 1, wherein:
   the exterior composite material panel is provided with an opening, and
   an edge of the opening is provided with a glass mounting position.

5. The composite material carrying structure applied to motor vehicles according to claim 4, wherein the glass mounting position is formed by bending the edge of the opening toward an inner side of the exterior composite material panel and extending into the opening.

6. A composite material carrying structure applied to motor vehicles comprising:
   a frame;
   an exterior composite material panel, disposed at an outer side of the frame;
   an interior composite material panel, which is overlapped with the exterior composite material panel, and wraps a portion of the frame together with the exterior composite material panel; and
   an R-corner outer frame, which is overlapped on the exterior composite material panel, and on which the interior composite material panel is overlapped, wherein an end of the R-corner outer frame and an end of the exterior composite material panel are bent oppositely and fitted at a lap joint between the R-corner outer frame and the exterior composite material panel; wherein:
      the exterior composite material panel comprises a plurality of composite material panels which are overlapped in pairs; and
      an overlapping end of each of the composite material panels is bent toward an inner side of the composite material panel and extends outward for overlapping with the other overlapping end of an adjacent composite material panel.

7. The composite material carrying structure applied to motor vehicles according to claim 1, wherein the R-corner outer frame is integrally formed to be one piece.

8. The composite material carrying structure applied to motor vehicles according to claim 1, wherein a buckle structure used for connecting the exterior composite material panel and the interior composite material panel is disposed on the interior composite material panel.

9. A composite material carrying structure applied to motor vehicles, comprising:
- a frame;
- an exterior composite material panel, disposed at an outer side of the frame;
- an interior composite material panel, which is overlapped with the exterior composite material panel, and wraps a portion of the frame together with the exterior composite material panel;
- an R-corner outer frame, which is overlapped on the exterior composite material panel, and on which the interior composite material panel is overlapped, wherein an end of the R-corner outer frame and an end of the exterior composite material panel are bent oppositely and fitted at a lap joint between the R-corner outer frame and the exterior composite material panel; and
- sealing members, wherein the sealing members are disposed at lap joints between the exterior composite material panel and the R-corner outer frame, and between the interior composite material panel and the R-corner outer frame.

\* \* \* \* \*